(12) United States Patent
Ho et al.

(10) Patent No.: US 8,747,693 B2
(45) Date of Patent: Jun. 10, 2014

(54) SILICA HAVING METAL IONS ABSORBED THEREON AND FABRICATING METHOD THEREOF

(75) Inventors: Yun-Lung Ho, Miaoli County (TW); Song-Yuan Chang, Chiayi County (TW); Ming-Hui Lu, Taipei (TW); Chung-Wei Chiang, Taoyuan County (TW)

(73) Assignee: UWIZ Technology Co., Ltd., Taoyuan County (TW)

( * ) Notice: Subject to any disclaimer, the term of this patent is extended or adjusted under 35 U.S.C. 154(b) by 0 days.

(21) Appl. No.: 13/615,539

(22) Filed: Sep. 13, 2012

(65) Prior Publication Data
US 2013/0068995 A1 Mar. 21, 2013

(30) Foreign Application Priority Data
Sep. 19, 2011 (TW) .................... 100133661

(51) Int. Cl.
*C09K 13/00* (2006.01)
*C01B 33/20* (2006.01)

(52) U.S. Cl.
USPC ......... 252/79.1; 252/79.5; 423/265; 423/324; 423/325; 423/326; 423/335; 423/349; 423/350; 423/513; 51/308; 502/407

(58) Field of Classification Search
USPC ............... 252/79.1, 79.2, 79.3, 79.4, 79.5; 423/265, 324, 325, 326, 334, 335, 349, 423/350, 513; 51/308; 502/407
See application file for complete search history.

(56) References Cited

U.S. PATENT DOCUMENTS

| | | | |
|---|---|---|---|
| 7,915,327 B2 * | 3/2011 | Keoshkerian et al. | 523/201 |
| 8,262,939 B2 * | 9/2012 | Kim et al. | 252/500 |
| 8,449,856 B2 * | 5/2013 | Yano et al. | 423/335 |
| 2009/0250656 A1 * | 10/2009 | Siddiqui et al. | 252/79.1 |
| 2010/0181525 A1 * | 7/2010 | Belmont | 252/79.1 |

FOREIGN PATENT DOCUMENTS

TW 201031739 9/2010

* cited by examiner

*Primary Examiner* — Nadine Norton
*Assistant Examiner* — Christopher Remavege
(74) *Attorney, Agent, or Firm* — Jianq Chyun IP Office

(57) ABSTRACT

A silica having metal ions absorbed thereon and a fabricating method thereof are provided. The silica having metal ions absorbed thereon is a silica having metal ions absorbed thereon and being modified with persulfate salt. The method includes following steps. A solution is provided, and the solution includes silica and persulfate salt therein. The solution is heated to react the silica with the persulfate salt, so as to obtain silica modified with persulfate salt. Metal ion source is added in the solution, the metal ion source dissociates metal ions, and the silica modified with persulfate salt absorbs the metal ions to obtain the silica having metal ions absorbed thereon.

20 Claims, 4 Drawing Sheets

US 8,747,693 B2

SILICA HAVING METAL IONS ABSORBED THEREON AND FABRICATING METHOD THEREOF

CROSS-REFERENCE TO RELATED APPLICATION

This application claims the priority benefit of Taiwan application serial no. 100133661, filed on Sep. 19, 2011. The entirety of the above-mentioned patent application is hereby incorporated by reference herein and made a part of this specification.

BACKGROUND OF THE INVENTION

1. Field of the Invention

The present invention relates to a silica and a fabricating method thereof, and particularly to a silica having metal ions absorbed thereon and a fabricating method thereof.

2. Description of Related Art

In processes of very large scale integrated circuit (VLSI), chemical mechanical polishing (CMP) processes provide overall global planarization of a surface of a wafer. Especially when semiconductor processes enter the field of sub-microns, CMP methods are an even more indispensable processing technology.

Currently, the CMP of a tungsten substrate is performed on the basis of Fenton's reaction (i.e. combination of $Fe^{3+}$ and $H_2O_2$). However, a disadvantage of performing CMP in this manner is that there tend to be $Fe^{3+}$ residues and hydrogen peroxide is consumed extremely fast.

SUMMARY OF THE INVENTION

The present invention provides a fabricating method of a silica having metal ions absorbed thereon, which significantly reduces a residual amount of the metal ions in a solution.

The present invention provides a silica having metal ions absorbed thereon, which effectively lowers a consumption rate of hydrogen peroxide when being used in polishing of a tungsten substrate.

The present invention proposes a fabricating method of a silica having metal ions absorbed thereon, which includes the following steps. A solution is provided, and the solution includes silica and persulfate salt therein. The solution is heated to react the silica with the persulfate salt, such that silica modified with persulfate salt is obtained. Metal ion source is added in the solution. The metal ion source dissociates metal ions. The silica modified with persulfate salt absorbs the metal ions, such that the silica having metal ions absorbed thereon is obtained.

According to an embodiment of the present invention, in the above fabricating method of a silica having metal ions absorbed thereon, the silica is, for example, nano silica.

According to an embodiment of the present invention, in the above fabricating method of a silica having metal ions absorbed thereon, a material of the silica is, for example, colloidal silica, fumed silica, polymer-silica core-shell particles, silica-containing composite colloids, or a combination of any two or more of the foregoing.

According to an embodiment of the present invention, in the above fabricating method of a silica having metal ions absorbed thereon, the silica is, for example, a silica purified by cation exchange resin.

According to an embodiment of the present invention, in the above fabricating method of a silica having metal ions absorbed thereon, the persulfate salt is, for example, sodium persulfate, potassium persulfate, ammonium persulfate, or a combination of any two or more of the foregoing.

According to an embodiment of the present invention, in the above fabricating method of a silica having metal ions absorbed thereon, the metal ion source is, for example, metal sulfate, metal nitrate, metal haloid, metal organic acid salt, metal ion complex, or a combination of any two or more of the foregoing.

According to an embodiment of the present invention, in the above fabricating method of a silica having metal ions absorbed thereon, the metal ions are, for example, $Fe^{3+}$, $Fe^{2+}$, $Cu^{2+}$, $Ag^+$, or a combination of any two or more of the foregoing.

According to an embodiment of the present invention, in the above fabricating method of a silica having metal ions absorbed thereon, a weight percentage concentration of the silica is, for example, 0.05% to 50%, a dosage of the persulfate salt is, for example, 10 ppm to 100000 ppm, and a dosage of the metal ion source is, for example, 0.1 ppm to 1500 ppm.

According to an embodiment of the present invention, in the above fabricating method of a silica having metal ions absorbed thereon, the silica modified with persulfate salt can absorb 99% to 100% of the metal ions.

According to an embodiment of the present invention, in the above fabricating method of a silica having metal ions absorbed thereon, a temperature of the heated solution is, for example, 50° C. to 90° C.

According to an embodiment of the present invention, in the above fabricating method of a silica having metal ions absorbed thereon, the solution is heated for, for example, 1 hour to 3 hours.

According to an embodiment of the present invention, in the above fabricating method of a silica having metal ions absorbed thereon, a pH value of the solution is in a range of, for example, not less than 4 but less than 7, when the silica modified with persulfate salt absorbs the metal ions.

According to an embodiment of the present invention, in the above fabricating method of a silica having metal ions absorbed thereon, a pH adjustor used is, for example, potassium hydroxide.

According to an embodiment of the present invention, in the above fabricating method of a silica having metal ions absorbed thereon, a step of stirring the solution is further included when the silica modified with persulfate salt absorbs the metal ions.

According to an embodiment of the present invention, in the above fabricating method of a silica having metal ions absorbed thereon, a step of cooling the solution is further included after the silica modified with persulfate salt is obtained.

According to an embodiment of the present invention, in the above fabricating method of a silica having metal ions absorbed thereon, a temperature of the solution is, for example, room temperature when the silica modified with persulfate salt absorbs the metal ions.

The present invention proposes a silica having metal ions absorbed thereon, which is a silica having metal ions absorbed thereon and being modified with persulfate salt.

According to an embodiment of the present invention, in the above silica having metal ions absorbed thereon, the silica having metal ions absorbed thereon and being modified with persulfate salt is, for example, $Si-O-SO_3M$, wherein M is a metal ion of $Fe^{3+}$, $Fe^{2+}$, $Cu^{2+}$, $Ag^+$, or a combination of any two or more of the foregoing.

According to an embodiment of the present invention, in the above silica having metal ions absorbed thereon, the persulfate salt is, for example, sodium persulfate, potassium persulfate, ammonium persulfate, or a combination of any two or more of the foregoing.

According to an embodiment of the present invention, in the above silica having metal ions absorbed thereon, a material of the silica is, for example, colloidal silica, fumed silica, polymer-silica core-shell particles, silica-containing composite colloids, or a combination of any two or more of the foregoing.

Based on the above, by means of the fabricating method of a silica having metal ions absorbed thereon proposed by the present invention, a residual amount of the metal ions in the solution is reduced.

Furthermore, the fabricating method of a silica having metal ions absorbed thereon proposed by the present invention can be completed without complicated operation.

In addition, when using the silica having metal ions absorbed thereon proposed by the present invention in polishing of a tungsten substrate, a consumption rate of hydrogen peroxide is effectively lowered.

In order to make the aforementioned and other features and advantages of the present invention more comprehensible, embodiments accompanying figures are described in detail below.

DETAILED DESCRIPTION OF THE INVENTION

Figure 1:
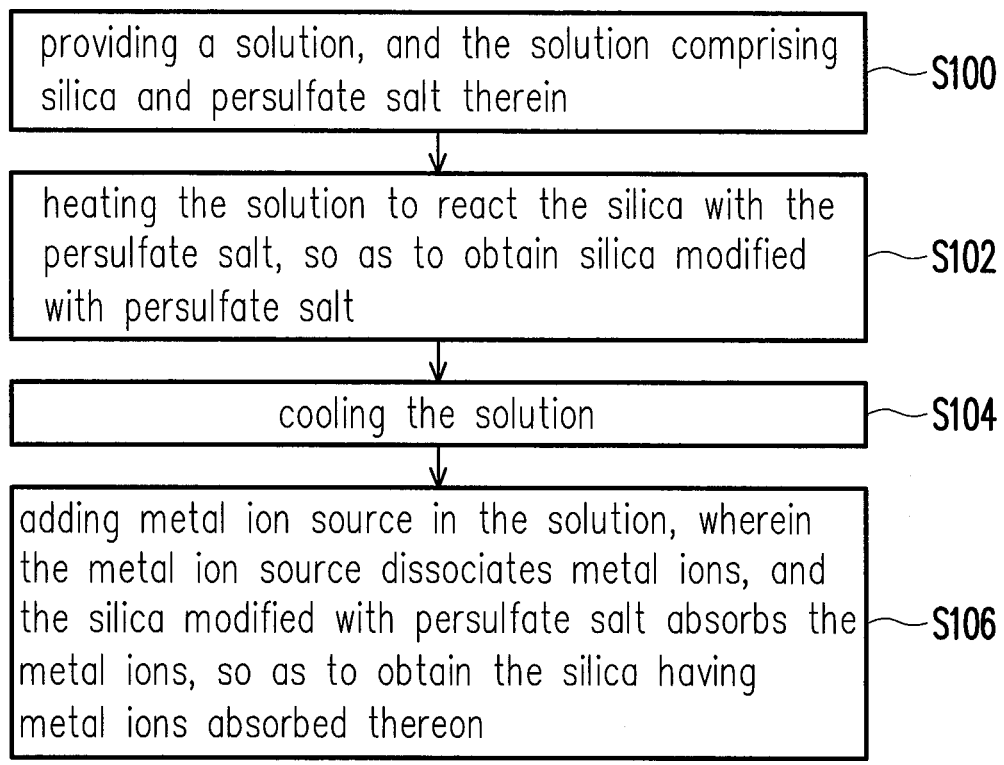
FIG. 1 illustrates a flow chart of fabricating a silica having metal ions absorbed thereon in an embodiment of the present invention.

FIG. 1 illustrates a flow chart of fabricating a silica having metal ions absorbed thereon in an embodiment of the present invention.

Referring to FIG. 1, first, step S100 is performed to provide a solution, and the solution comprises silica and persulfate salt therein. A weight percentage concentration of the silica is, for example, 0.05% to 50%. The silica is, for example, nanosilica. A material of the silica is, for example, colloidal silica, fumed silica, polymer-silica core-shell particles, silica-containing composite colloids, or a combination of any two or more of the foregoing. The silica is, for example, a silica purified by cation exchange resin. A dosage of the persulfate salt is, for example, 10 ppm to 100000 ppm. The persulfate salt is, for example, sodium persulfate, potassium persulfate, ammonium persulfate, or a combination of any two or more of the foregoing.

Next, step S102 is performed to heat the solution to react the silica with the persulfate salt, such that silica modified with persulfate salt is obtained. A temperature of the heated solution is, for example, 50° C. to 90° C. The solution is heated for, for example, 1 hour to 3 hours.

Furthermore, step S104 is selectively performed to cool the solution. For example, the solution may be cooled to room temperature.

Then, step S106 is performed to add metal ion source in the solution. The metal ion source dissociates metal ions. The silica modified with persulfate salt absorbs the metal ions, such that the silica having metal ions absorbed thereon is obtained. When the silica modified with persulfate salt absorbs the metal ions, the solution is selectively stirred, which improves absorption efficiency of the silica modified with persulfate salt to absorb the metal ions; meanwhile, a pH value of the solution is in a range of, for example, not less than 4 but less than 7, and a temperature of the solution is, for example, room temperature. A pH adjustor used is, for example, potassium hydroxide. A dosage of the metal ion source is, for example, 0.1 ppm to 1500 ppm. The metal ion source is, for example, metal sulfate, metal nitrate, metal haloid, metal organic acid salt, metal ion complex, or a combination of any two or more of the foregoing. The metal ions are, for example, $Fe^{3+}$, $Fe^{2+}$, $Cu^{2+}$, $Ag^+$, or a combination of any two or more of the foregoing.

In addition, the silica modified with persulfate salt can absorb 99% to 100% of the metal ions. That is, a residual amount of the metal ions ionized in the solution is not more than 1%, and even not more than 0.2 ppm.

The following is an explanation of a silica having metal ions absorbed thereon proposed by an embodiment of the present invention. The silica is a silica having metal ions absorbed thereon and being modified with persulfate salt. The silica having metal ions absorbed thereon may be obtained by the embodiment of the fabricating method disclosed by FIG. 1. However, the present invention is not limited thereto. The silica having metal ions absorbed thereon and being modified with persulfate salt is, for example, Si—O—SO$_3$M, wherein M is a metal ion of $Fe^{3+}$, $Fe^{2+}$, $Cu^{2+}$, $Ag^+$, or a combination of any two or more of the foregoing. The persulfate salt is, for example, sodium persulfate, potassium persulfate, ammonium persulfate, or a combination of any two or more of the foregoing. A material of the silica is, for example, colloidal silica, fumed silica, polymer-silica core-shell particles, silica-containing composite colloids, or a combination of any two or more of the foregoing.

Based on the above embodiment, in the above fabricating method of a silica having metal ions absorbed thereon, since the silica modified with persulfate salt has a high selective absorbability to the metal ions, a residual amount of the metal ions in the solution is reduced. Furthermore, the silica having metal ions absorbed thereon, which is fabricated by the fabricating method proposed by the above embodiment, can be obtained simply by heating silica on the market. Hence the operation is quite easy and can be completed without any complicated process. In addition, when using the silica having metal ions absorbed thereon proposed by the above embodiment in polishing of a tungsten substrate, a reaction speed of hydrogen peroxide is slower, therefore effectively lowering a consumption rate of the hydrogen peroxide.

Figure 2:
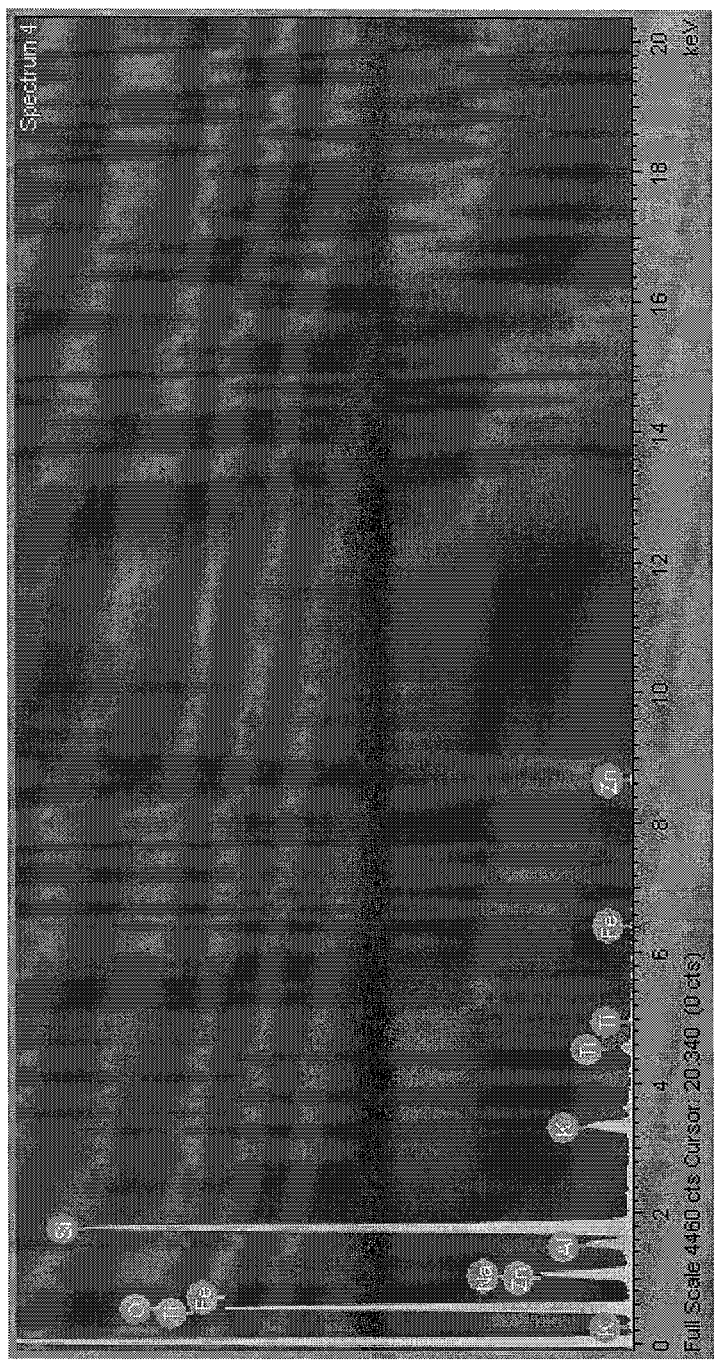
FIG. 2 is a photograph of a spectral scan using scanning electron microscope-energy dispersive X-ray spectroscopy (SEM-EDX) in Experiment 1.
Figure 3:
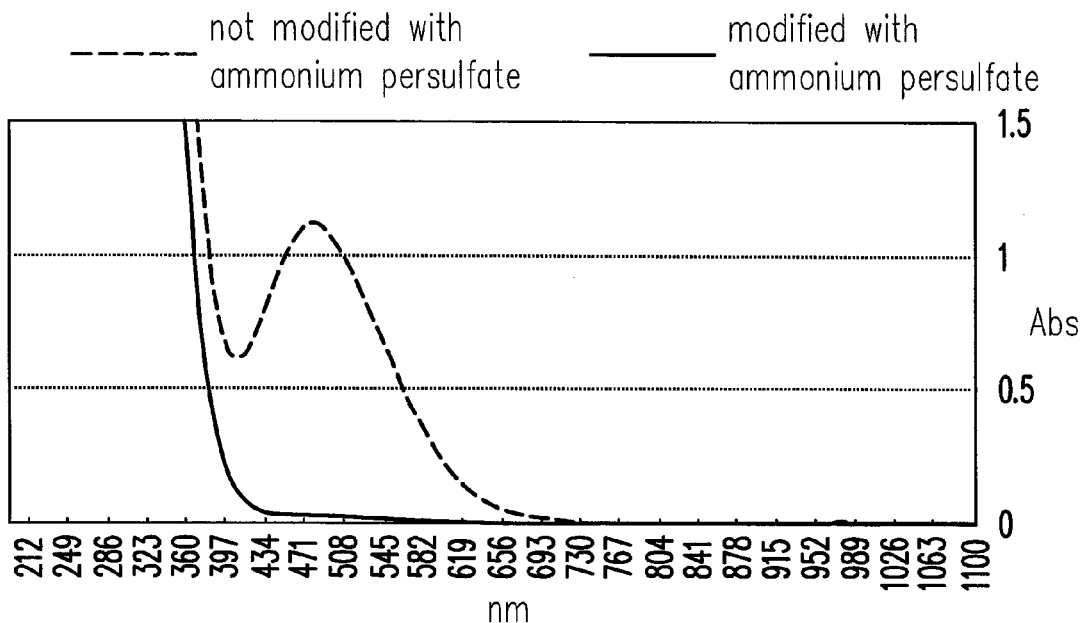
FIG. 3 to FIG. 5 are curve graphs of the NaSCN detection method in Experiment 1 to Experiment 3, respectively.
Figure 4:
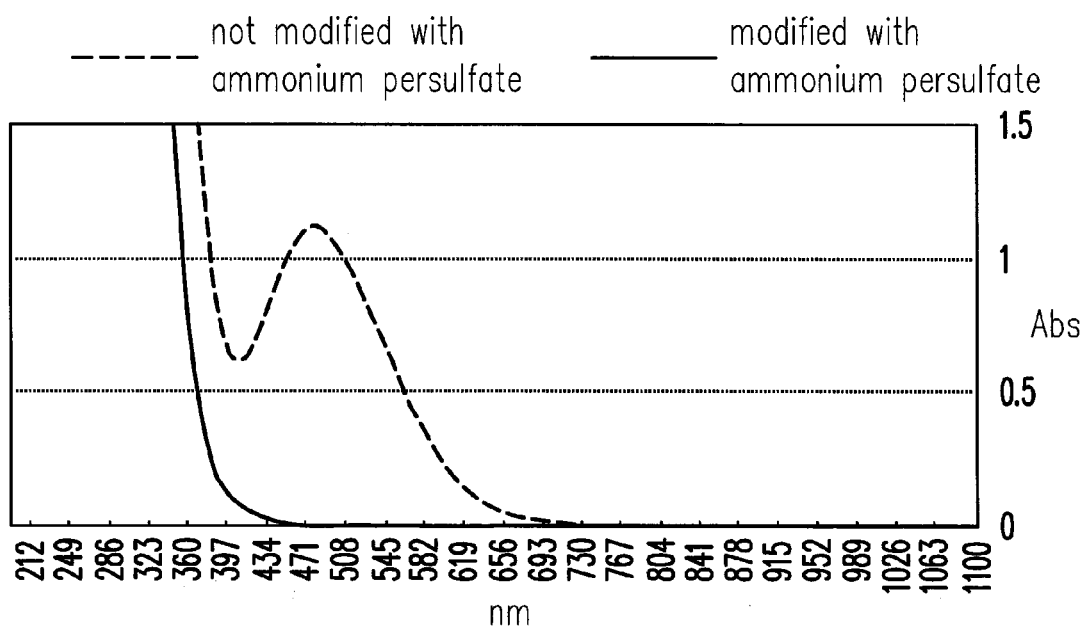
Figure 5:
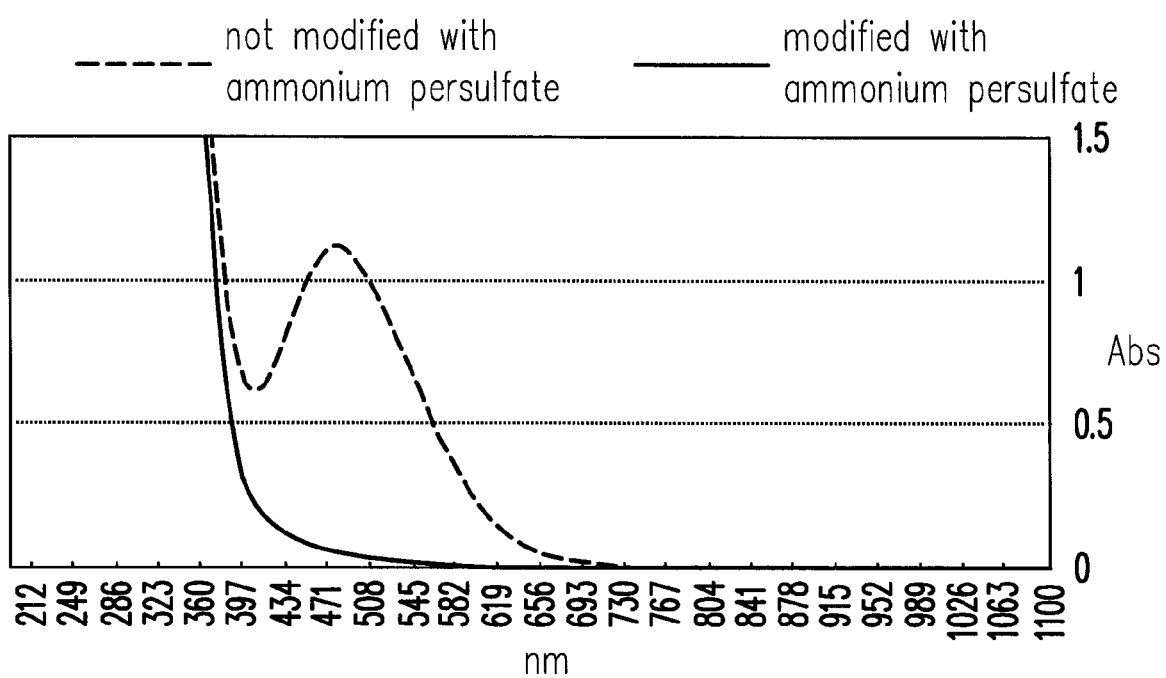

In the following, experiments in practice will be described. FIG. 2 is a photograph of a spectral scan using SEM-EDX in Experiment 1. FIG. 3 to FIG. 5 are curve graphs of the NaSCN detection method in Experiment 1 to Experiment 3, respectively.

Experiment 1

1. Preparation Method:

Colloidal nanosilica (with a particle size of 125 nm) on the market is purified by cation exchange resin, and then is used to produce an aqueous solution with 1% colloidal nanosilica, which has 300 ppm of ammonium persulfate (APS) added therein. Next, the solution is heated at 60° C. for 3 hours to react the colloidal nanosilica with the ammonium persulfate, such that colloidal nanosilica modified with ammonium persulfate is obtained. Then, the solution is cooled back to room temperature. After that, 20 ppm of iron(III) nitrate is added in the solution, and an aqueous solution with 1% potassium hydroxide is added to adjust a pH value of the solution to 5. Next, the solution is stirred under room temperature for 1 hour, such that the colloidal nanosilica modified with ammonium persulfate completes absorption of iron ions, and colloidal nanosilica having iron ions absorbed thereon is obtained.

2. Detection Methods and Results:

(1) SEM-EDX Spectral Scan Method:

Referring to FIG. 2, an SEM-EDX spectral scan is given to the colloidal nanosilica having iron ions absorbed thereon, and a Fe signal is clearly seen.

(2) NaSCN Detection Method:

a. The colloidal nanosilica solution after completion of the absorption is centrifuged until there is no suspended solid present.

b. The upper clarified liquid after the centrifugation is taken out, and is added with an aqueous solution with 40% NaSCN.

c. If there is $Fe^{3+}$ in the clarified liquid, the solution after the addition of NaSCN will appear red.

d. A UV spectrum of the mixed solution of the clarified liquid and NaSCN is measured. If there is $Fe^{3+}$ in the clarified liquid, an absorption signal will appear at a position of 480 nm.

Detection result: Referring to FIG. 3, it can be seen from the UV spectrum that the colloidal nanosilica modified with ammonium persulfate has good absorbability to $Fe^{3+}$. Hence there is almost no absorption signal at the position of 480 nm, and the solution is clear and has no color. In addition, the colloidal nanosilica not modified with ammonium persulfate has bad absorbability to $Fe^{3+}$. Hence there is an apparent absorption signal at the position of 480 nm, and the solution appears red.

(3) Inductively Coupled Plasma Mass Spectrometry (ICP-MS) Detection Method:

A $Fe^{3+}$ ion concentration in the clarified liquid actually measured by an ICP-MS method is 0.10 ppm.

Experiment 2

1. Preparation Method:

Colloidal nanosilica (with a particle size of 80 nm) on the market is purified by cation exchange resin, and then is used to produce an aqueous solution with 3% colloidal nanosilica, which has 500 ppm of ammonium persulfate added therein. Next, the solution is heated at 60° C. for 3 hours to react the colloidal nanosilica with the ammonium persulfate, such that colloidal nanosilica modified with ammonium persulfate is obtained. Then, the solution is cooled back to room temperature. After that, 50 ppm of iron(III) nitrate is added in the solution, and an aqueous solution with 1% potassium hydroxide is added to adjust a pH value of the solution to 6. Next, the solution is stirred under room temperature for 1 hour, such that the colloidal nanosilica modified with ammonium persulfate completes absorption of iron ions, and colloidal nanosilica having iron ions absorbed thereon is obtained.

2. Detection Methods and Results:

(1) NaSCN Detection Method:

Referring to FIG. 4, it can be seen from the UV spectrum that the colloidal nanosilica modified with ammonium persulfate has good absorbability to $Fe^{3+}$. Hence there is almost no absorption signal at a position of 480 nm, and the solution is clear and has no color. In addition, the colloidal nanosilica not modified with ammonium persulfate has bad absorbability to $Fe^{3+}$. Hence there is an apparent absorption signal at the position of 480 nm, and the solution appears red.

(2) ICP-MS Detection Method:

A $Fe^{3+}$ ion concentration in the clarified liquid actually measured by an ICP-MS method is 0.085 ppm.

Experiment 3

1. Preparation Method:

Colloidal nanosilica (with a particle size of 100 nm) on the market is purified by cation exchange resin, and then is used to produce an aqueous solution with 10% colloidal nanosilica, which has 900 ppm of ammonium persulfate added therein. Next, the solution is heated at 60° C. for 3 hours to react the colloidal nanosilica with the ammonium persulfate, such that colloidal nanosilica modified with ammonium persulfate is obtained. Then, the solution is cooled back to room temperature. After that, 200 ppm of iron(III) nitrate is added in the solution, and an aqueous solution with 1% potassium hydroxide is added to adjust a pH value of the solution to 5. Next, the solution is stirred under room temperature for 1 hour, such that the colloidal nanosilica modified with ammonium persulfate completes absorption of iron ions, and colloidal nanosilica having iron ions absorbed thereon is obtained.

2. Detection Methods and Results:

(1) NaSCN Detection Method:

Referring to FIG. 5, it can be seen from the UV spectrum that the colloidal nanosilica modified with ammonium persulfate has good absorbability to $Fe^{3+}$. Hence there is almost no absorption signal at a position of 480 nm, and the solution is clear and has no color. In addition, the colloidal nanosilica not modified with ammonium persulfate has bad absorbability to $Fe^{3+}$. Hence there is an apparent absorption signal at the position of 480 nm, and the solution appears red.

(2) ICP-MS Detection Method:

A $Fe^{3+}$ ion concentration in the clarified liquid actually measured by an ICP-MS method is 0.075 ppm.

Polishing Test and Result

The colloidal nanosilica having iron ions absorbed thereon can be applied to a polishing recipe. For example, a polishing experiment of tungsten and tetraethyl orthosilicate (TEOS) test wafers, using a polishing recipe based on Experiment 2, is carried out on a polishing machine Mirra 3400 made by Applied Materials, Inc. In the polishing experiment, a slurry is provided at a rate of 200 ml per minute, a polishing pad is CUP4410 (product number, made by the Dow Chemical Company), a pad dresser is S-PDA32P-3FN (product number, made by Kinik Company), and a pad dresser pressure is 5 lbf. A polishing condition is that the polishing is performed for 50 seconds with a polishing head pressure of 4 psi, and a relative rotational speed of the polishing pad to the polishing head is 100 rpm to 94 rpm. A dressing condition is in-situ.

Polishing Result: A polishing rate of the tungsten test wafer is 2674 angstrom per minute, a polishing rate of the TEOS test wafer is 358 angstrom per minute, and a selection ratio is 7.47.

In summary, the above embodiment has at least the following advantages:

1. By means of the fabricating method of a silica having metal ions absorbed thereon proposed by the above embodiment, a residual amount of the metal ions in a solution is reduced.

2. The fabricating method of a silica having metal ions absorbed thereon proposed by the above embodiment is easy to perform and can be completed without complicated process.

3. When using the silica having metal ions absorbed thereon proposed by the above embodiment in polishing of a tungsten substrate, a consumption rate of hydrogen peroxide is effectively lowered.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A fabricating method of silica having metal ions absorbed thereon, comprising:
   providing a solution, the solution comprising silica and persulfate salt therein;
   heating the solution to react the silica with the persulfate salt, so as to obtain silica modified with persulfate salt; and
   adding metal ion source in the solution, wherein the metal ion source dissociates metal ions, and the silica modified with persulfate salt absorbs the metal ions, so as to obtain the silica having metal ions absorbed thereon.

2. The fabricating method of silica having metal ions absorbed thereon as claimed in claim 1, wherein the silica comprises nanosilica.

3. The fabricating method of silica having metal ions absorbed thereon as claimed in claim 1, wherein a material of the silica comprises colloidal silica, fumed silica, polymer-silica core-shell particles, silica-containing composite colloids, or a combination of any two or more of the foregoing.

4. The fabricating method of silica having metal ions absorbed thereon as claimed in claim 1, wherein the silica comprises a silica purified by cation exchange resin.

5. The fabricating method of silica having metal ions absorbed thereon as claimed in claim 1, wherein the persulfate salt comprises sodium persulfate, potassium persulfate, ammonium persulfate, or a combination of any two or more of the foregoing.

6. The fabricating method of silica having metal ions absorbed thereon as claimed in claim 1, wherein the metal ion source comprises metal sulfate, metal nitrate, metal haloid, metal organic acid salt, metal ion complex, or a combination of any two or more of the foregoing.

7. The fabricating method of silica having metal ions absorbed thereon as claimed in claim 1, wherein the metal ions comprise $Fe^{3+}$, $Fe^{2+}$, $Cu^{2+}$, $Ag^{+}$, or a combination of any two or more of the foregoing.

8. The fabricating method of silica having metal ions absorbed thereon as claimed in claim 1, wherein
   a weight percentage concentration of the silica is 0.05% to 50%,
   a dosage of the persulfate salt is 10 ppm to 100000 ppm, and
   a dosage of the metal ion source is 0.1 ppm to 1500 ppm.

9. The fabricating method of silica having metal ions absorbed thereon as claimed in claim 8, wherein the silica modified with persulfate salt absorbs 99% to 100% of the metal ions.

10. The fabricating method of silica having metal ions absorbed thereon as claimed in claim 1, wherein a temperature of the heated solution is 50° C. to 90° C.

11. The fabricating method of silica having metal ions absorbed thereon as claimed in claim 1, wherein the solution is heated for 1 hour to 3 hours.

12. The fabricating method of silica having metal ions absorbed thereon as claimed in claim 1, wherein a pH value of the solution is in a range of not less than 4 but less than 7 when the silica modified with persulfate salt absorbs the metal ions.

13. The fabricating method of silica having metal ions absorbed thereon as claimed in claim 12, wherein a pH adjustor used comprises potassium hydroxide.

14. The fabricating method of silica having metal ions absorbed thereon as claimed in claim 1, wherein the fabricating method further comprises stirring the solution when the silica modified with persulfate salt absorbs the metal ions.

15. The fabricating method of silica having metal ions absorbed thereon as claimed in claim 1, wherein the fabricating method further comprises cooling the solution after obtaining the silica modified with persulfate salt.

16. The fabricating method of silica having metal ions absorbed thereon as claimed in claim 1, wherein a temperature of the solution comprises room temperature when the silica modified with persulfate salt absorbs the metal ions.

17. Silica having metal ions absorbed thereon, which is a silica having metal ions absorbed thereon and being modified with persulfate salt.

18. The silica having metal ions absorbed thereon as claimed in claim 17, wherein the silica having metal ions absorbed thereon and being modified with persulfate salt comprises Si—O—$SO_3M$, wherein M is a metal ion of $Fe^{3+}$, $Fe^{2+}$, $Cu^{2+}$, $Ag^{+}$, or a combination of any two or more of the foregoing.

19. The silica having metal ions absorbed thereon as claimed in claim 17, wherein the persulfate salt comprises sodium persulfate, potassium persulfate, ammonium persulfate, or a combination of any two or more of the foregoing.

20. The silica having metal ions absorbed thereon as claimed in claim 17, wherein a material of the silica comprises colloidal silica, fumed silica, polymer-silica core-shell particles, silica-containing composite colloids, or a combination of any two or more of the foregoing.

* * * * *